United States Patent Office 3,839,539
Patented Oct. 1, 1974

3,839,539
SYNTHETIC FLUORIDE CONTAINING
ZEOLITE SYSTEMS
Curtis Homer Elliott, Jr., Baltimore, Md., assignor to
W. R. Grace & Co., New York, N.Y.
No Drawing. Continuation-in-part of application Ser. No.
803,117, Feb. 27, 1969, now Patent No. 3,594,331.
This application Oct. 4, 1971, Ser. No. 186,458
The portion of the term of the patent subsequent to
July 20, 1988, has been disclaimed
Int. Cl. B01j 11/40, 11/78; C01b 33/28
U.S. Cl. 423—329    15 Claims

ABSTRACT OF THE DISCLOSURE

Fluoride containing zeolites are produced from an admixture of active silica source and active alumina source solutions by incorporating a fluoride compound of fluosilicate compound in this initial zeolite precursor reactant solution. As the zeolite is formed, the fluoride is incorporated into the zeolite at a concentration of about 0.01 to 0.15 percent by weight (dry basis). The resulting zeolites have higher thermal and steam stabilities, higher surface areas, smaller crystallites and lower contaminant content. The presence of the fluoride in the precursor solution enhances these properties of the zeolite.

---

This application is a continuation-in-part of my application Ser. No. 803,117, filed Feb. 27, 1969, now U.S. Pat. 3,594,331, issued July 20, 1971.

In my first application, now U.S. Pat. 3,594,331, concerning the incorporation of fluoride ions into a zeolitic molecular sieve, the fluoride ions were incorporated into the sieve after the zeolite had been fully synthesized, or for that matter into naturally available zeolites by a contacting technique. This contacting technique provides the sieve with an unwashable fluoride content of .01 to .15 percent. This fluoride content yields a zeolite having a substantially greater high temperature thermal and steam stability.

Since the filing of my initial application several others in the art have developed varying techniques for incorporating fluoride into the structure of the molecular sieve. However, these techniques developed thus far consist of varying post treatments of the zeolite in order to incorporate the desired fluoride content into the zeolite. Exemplary on this point is 3,575,887 which discloses the treating of a zeolite with a fluoride and chloride containing solution. This method, although it does incorporate fluoride into the zeolite structure, requires the added treating step. My present invention is a distinct improvement over this and the techniques of my earlier application by allowing the fluoride to be incorporated into a synthetic zeolite during the synthesis of the zeolite. And besides the savings in decreasing the number of steps, there are other advantages. One advantage is that large quantities of dilute fluoride solutions are not required, lessening the disposal problems in view of the ever more stringent pollution controls. Other advantages are that the zeolites produced have higher surface areas and smaller crystallite size. Another advantage is that a purer zeolite is formed. In some way, the fluoride suppresses contaminant formation during crystallization.

It is, therefore, a prime object of this invention to set out a technique whereby fluoride ion can be incorporated into a zeolite structure during the synthesis of the zeolite.

It is further an object of this invention to produce fluoride containing zeolites wherein the fluoride is present in the zeolite structure in an unwashable condition.

It is additionally and particularly an object of this invention to produce fluoride containing zeolites which have a greater thermal and steam stability and which can therefore be very effectively used as active components in petroleum cracking or hydrocracking catalysts.

In brief summary, the present invention consists essentially of providing a fluoride ion source along with a reactive silica source and a reactive alumina source, and reacting this mixture to form a reaction product containing incorporated fluoride ion. This reaction product is then aged and crystallized to form the particular crystalline zeolite. The fluoride in this zeolite is held in the crystalline structure in a tightly bound unwashable condition. The zeolite after crystallization can then be dried and activated, or may undergo an exchange of the sodium ions with potassium, ammonium, alkaline earth, transition metal or rare earth metal ions. In essence, any of the known stabilizing procedures may be performed on the fluoride containing crystalline zeolite in order to further enhance the stability or other properties.

In more detail, my invention consists in producing synthetic crystalline zeolites having fluoride coordinated into the structure. The synthetic zeolites which can be produced containing this coordinated fluoride include the zeolites which in the hydrated form are designated by the formula $$M_{2/n}O:Al_2O_3:WSiO_2:YH_2O$$

where M is a cation, $n$ represents the valence of the cation, W the moles of silica. The commercially important synthetic zeolites designated A, X and Y by Linde Division of Union Carbide are in one mode differentiated from each other in the $SiO_2$ content (W value). Conventionally a Zeolite A has a W value in the range of 1.85, Zeolite X in the range of 2–3 and Zeolite Y in the range of greater than 3 to 7. Of course there are other differences such as in pore size, crystalline structure, adsorption capacities and so on, but the variation in silica content provides a very convenient means of description. The other zeolites which may be produced having a coordinated fluoride content include those designated Zeolite L, D, R, S and T. Also many naturally occurring zeolites which can also be synthesized can be produced having a coordinated fluorine content. These include mordenite, chabazite, offretite, ferrionite, clinoptilolite, faujasite, gmelinite and erionite as well as other.

In essence, therefore, any crystalline zeolite which can be synthesized from component mixtures can be provided with an unwashable, coordinated fluoride content which enhances the stability of the crystalline zeolite structure. The mechanism of this stabilizing effect of coordinated fluoride is not presently known, but it is hypothesized that the alumina in the zeolite is prevented from undergoing reorientation.

The various modes of synthesis of the zeolites, and particularly A, X and Y, are generally known. These may be produced either from the hydrothermal conversion of a clay such as metakaolin or halloysite, or by the reaction of an active silica source solution and an active alumina source solution. Of course, when a particular zeolite is to be produced, the reactant ratios, one to the other, must be adjusted so that a particular zeolite can be produced. As exemplary of this point, the reactant ratios for producing a zeolite Y are in the range of

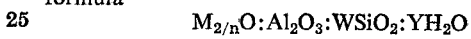

| | |
|---|---|
| $Na_2O/SiO_2$ | 0.4–0.6 |
| $SiO_2/Al_2O_3$ | 15–25 |
| $H_2O/Na_2O$ | 20–50 | for zeolite X in the range of

| | |
|---|---|
| $Na_2O/SiO_2$ | 1.2–1.5 |
| $SiO_2/Al_2O_3$ | 3–5 |
| $H_2O/Na_2O$ | 35–60 | and for zeolite A in the range of

| | |
|---|---|
| $Na_2O/SiO_2$ | 0.8–1.4 |
| $SiO_2/Al_2O_3$ | 1.8–2.2 |
| $H_2O/Na_2O$ | 30–60 |

The useful reactant ratios for the other zeolites can easily be calculated from their known formulae or obtained from the literature.

Further, in the formation of these crystalline zeolites, it has been found very useful to add a zeolite seed mixture. Such a seed solution mixture has a composition in the range of 8–30 $Na_2O$, 5–50 $SiO_2$, 0.1–4.0 $Al_2O_3$, 50–500 $H_2O$. These seed mixtures have been found to significantly accelerate the formation of crystalline zeolites. It is hypothesized that this solution forms nuclei which are active centers for zeolite crystallization.

The fluoride which is to be coordinated into the crystal structure of the zeolite must be one which is soluble or at least partially soluble in the aqueous active silica and active alumina solutions used to synthesize the zeolite. Very useful and preferred sources of flouride ions are the fluorides and fluosilicates of monovalent, divalent or trivalent metals, ammonia, hydrogen or quaternary ammonium cationic elements. The gram amount of fluoride source used depends on several factors. These are principally the amount to be coordinated into the zeolite, the degree of solubility of the fluoride source and the amount of fluoride that is available in the fluoride source. By available is meant the degree that fluoride is present in a dissociated condition. For example, although the fluosilicate ion contains six fluorine atoms, only two can be considered available. That is, only two of the fluorine atoms are present as dissociated fluoride ion and free to be coordinated into the zeolite structure.

The total fluorine content which is coordinated into the sieve is in the range of from about 0.01 to 0.15 percent of the total activated zeolite weight. This fluorine level in the finished zeolite can be accomplished by use of the following fluoride compound ratios. When the fluoride content is to be supplied by a fluosilicate, the ratio of fluosilicate to be used is $$\frac{\text{grams SiF}_6^=}{100 \text{ grams Al}_2O_3} = 1 \text{ to } 50$$

and preferably $$\frac{\text{grams SiF}_6^=}{100 \text{ grams Al}_2O_3} = 3 \text{ to } 25$$

When the fluoride content is to be supplied by anionic fluoride, the ratio of fluoride to be used is $$\frac{\text{grams F}^-}{100 \text{ grams Al}_2O_3} = 0.5 \text{ to } 10$$

and preferably $$\frac{\text{grams F}^-}{100 \text{ grams Al}_2O_3} = 1 \text{ to } 7$$

These ratios of fluosilicate and fluoride to alumina content of the active alumina source solution have proven very effective in producing a coordinated fluorine content of 0.01 to 0.15 percent in the synthesized crystalline zeolite.

In the preferred process of the invention, the required amount of an active silica solution, usually a sodium silicate solution, and the required amount of an active alumina solution are admixed along with the calculated amount of fluoride source solution. The fluoride source solution can be added separately or as a comixture with the silicate or active alumina solution. The active alumina solution may be an aluminate solution or an aluminum salt solution such as aluminum sulfate, or a mixture of these active alumina sources. At this stage, also, a zeolite seed solution can be added in an amount up to about 10 percent of the total weight of the solution. This multicomponent admixture is stirred or otherwise agitated to completely disperse the components. A slurry forms and in the next step this slurry is aged and/or crystallized. Aging consists of maintaining the dispersed admixture at about 20 to 120° C. for from about 1 to 48 hours. This aging can be an aging at a single temperature, or one conducted at two or more temperature ranges. When a zeolite seed solution is added, the necessary aging period is decreased to 1 to 12 hours and is usually conducted at from 70 to 120° C. However, when a zeolite seed solution is not added there is conventionally a cold aging at 20 to 70° C. during which crystallization nuclei form, followed by a hot aging at from 70 to 120° C. during which crystallization occurs. Such aging techniques are known in the art and have been practiced for some time. Further, it has been the practice in some instances to agitate the slurry during these aging periods. Crystallization is normally complete in about 1–24 hours, depending on the zeolite being formed.

Of course, this procedure is capable of variation. A seed mixture need not be added. Further sources of silica other than sodium silicate can be used, as can sources of alumina other than aluminum sulfate or aluminate. These, however, are variations known in the art and are essentially equivalent to the above outlined procedure.

After crystallization is completed, the zeolite can be washed, dried and activated, or it can undergo an ion exchange to remove part or substantially all of the sodium ion content. Exchange can be by any of the known techniques to produce zeolites having a sodium ion content of less than 0.1 percent (calculated as $Na_2O$). The exchanging ion may be potassium, ammonium, alkaline earth, rare earth or a transition metal ion, or a mixture of substances from this class. The result in any instance will be a fluorided zeolite of low sodium content also containing any added ions.

The following examples are set out to further amplify the present invention.

Example 1

This example illustrates the formation of fluorided zeolite Y using ammonium fluosilicate as the fluoride source. This example also illustrates the embodiment of the fluoride source being in admixture with an active source (sodium silicate).

As a first step, the four reactions solutions were separately prepared as follows.

Solution 1 consists of 2058 grams of 37°Bé. sodium silicate is mixed thoroughly with 392 grams of a seed solution having the composition 16 $Na_2O:Al_2O_3:15$ $SiO_2$: 320 $H_2O$ and formed from an admixture of a sodium silicate and sodium aluminate solution.

Solution 2 consists of 116 grams of aluminum sulfate dissolved in 313 grams of water.

Solution 3 consists of 13 grams of ammonium fluosilicate dissolved in 100 grams of water.

Solution 4 consists of a sodium aluminate solution prepared by dissolving 106 grams of hydrated alumina in 152 grams of 50.5 percent sodium hydroxide solution. Dissolution is by heating. 282 grams of water is then added to this solution.

Solution 3 was added to solution 1 with mixing. Solution 2 is then added to this combined admixture of solutions 1 and 3 with mixing, followed by the addition of solution 4 with mixing. A slurry formed and this slurry was hot aged at 95° C. to 105° C. for 11 hours. The resulting slurry product mix was diluted with water, filtered, washed free of mother liquor and dried. The product has an X-ray crystallinity of 89 percent of a standard sample, a surface area of 996 $M^2/g$. fluorine content of 0.032 percent (dry basis) and a $SiO_2/Al_2O_3$ ratio of 5.0.

As a basis for comparison, a zeolite sample was also produced using the above solutions 1, 2 and 4. That is, no fluoride ion was added. The same procedure was also used. The product zeolite had an X-ray crystallinity of 91 percent, surface area of 847 $M^2/g$. and a $SiO_2/Al_2O_3$ ratio of 4.7. The fluoride content was nil.

Example 2

This example illustrates the formation of fluorided zeolite Y using varying ratios of ammonium silicofluoride. This example also illustrates the embodiment of the fluoride source being in admixture with an active alumina source (aluminum sulfate).

As a first step, the four reactions solutions were separately prepared as follows:

Solution 1 consists of 2058 of 37° Bé. sodium silicate is mixed thoroughly with 392 grams of a seed solution having the composition 16 $Na_2O:Al_2O_3:15\ SiO_2:320\ H_2O$ and former from an admixture of a sodium silicate and sodium aluminate solution.

Solution 2 consists of 116 grams of aluminum sulfate dissolved in 313 grams of water.

Solution 3 consists of either 6.5 grams, 13 grams or 26 grams ammonium fluosilicate dissolved in 100 grams of water.

Solution 4 consists of a sodium aluminate solution prepared by dissolving 126 grams of hydrated alumina in 182 grams of 50.5 percent sodium hydroxide solution. Dissolution is by heating. 282 grams of water is then added to this solution.

Solution 3 was added to solution 2 with mixing. Solution 1 is then added to this combined admixture of solutions 1 and 3 with mixing, followed by the addition of solution 4 with mixing. A slurry formed and this slurry was hot aged at 95° C. to 105° C. for 9 hours. The resulting slurry product mix was diluted with water, filtered, washed free of mother liquor and dried.

The same addition procedure was conducted for each of the different ammonium fluosilicate contents in solution 3. Table 1 below sets out the properties of each of the produced zeolites with respect to fluoride contents.

TABLE 1

| | | | |
|---|---|---|---|
| $NH_4SiF_6$ (g.) | 6.5 | 13 | 26 |
| X-ray, percent | 97 | 101 | 100 |
| Cell size, A.° | 24.69 | 24.68 | 24.68 |
| Surface area, $M.^2/g$ | 884 | 934 | 919 |
| $SiO_2$, percent D.B. | 60.93 | 62.01 | 63.54 |
| $Al_2O_3$, percent D.B. | 23.79 | 23.43 | 22.63 |
| $Na_2O$, percent D.B. | 14.71 | 13.44 | 12.21 |
| F, percent D.B. | 0.018 | 0.029 | 0.032 |
| Mol $SiO_2/Al_2O_3$ | 4.35 | 4.5 | 4.8 |

Example 3

This example illustrates the synthesis of a fluorided zeolite Y using ammonium fluoride in place of ammonium fluosilicate as the fluoriding agent.

As a first step, the four reactions solutions were separately prepared as follows.

Solution 1 consists of 2058 grams of 37° Bé. sodium silicate is mixed thoroughly with 392 grams of a seed solution having the composition 16 $Na_2O:Al_2O_3:15\ SiO_2: 320\ H_2O$ and formed from an admixture of a sodium silicate and sodium aluminate solution.

Solution 2 consists of 197 grams of aluminum sulfate dissolved in 313 grams of water.

Solution 3 consists of 6 grams of ammonium fluosilicate dissolved in 100 grams of water.

Solution 4 consists of a sodium aluminate solution prepared by dissolving 106 grams of hydrated alumina in 152 grams of 50.5 percent sodium hydroxide solution. Dissolution is by heating. 282 grams of water is then added to this solution.

Solution 3 was added to solution 1 with mixing. Solution 2 is then added to this combined admixture of solutions 1 and 3 with mixing, followed by the addition of solution 4 with mixing. A slurry formed and this slurry was hot aged at 95° C. to 105° C. for 11 hours. The resulting slurry product mix was diluted with water, filtered, washed free of mother liquor and dried.

The product zeolite has an unwashable fluorine content of 0.029 percent (D.B.), a surface area of 892 $M^2/g$ and a $SiO_2/Al_2O$ ratio of 4.9.

Example 4

This example illustrates the stability of the zeolites produced by coordinating in an unwashable fluoride content. A fluorided zeolite was prepared according to the procedue of Example 1 and had the following characteristics:

X-ray Crystallinity _____ 94%.
Cell Size _____ 24.62 A.
Surface Area _____ 826 $M^2/g$.
Fluoride, (dry basis) _____ 0.020%.
Mol $SiO_2/Al_2O_3$ Ratio _____ 4.96.

Two cracking catalysts were produced by first rare earth exchanging the sodium ions from the zeolite to an $Na_2O$ content less than 1 percent. A conventional exchange process was used incorporating a heat treatment at 1000° F. between contactings with the rare earth chloride solutions. The heat treatment serves to make the replacement of sodium ions easier. The final exchange is with an ammonium ion solution. After rare earth exchange, the rare earth zeolite Y was incorporated into an amorphous silica-alumina matrix and tested. The values for the catalysts are given in Table 2.

TABLE 2

| Tests | Catalyst 1 | Catalyst 2 |
|---|---|---|
| $Re_2O_3$, dry basis, percent | 3.6 | 3.3 |
| Peak height: | | |
| After activation at 1,000° F., mm | 64 | 70 |
| After activation at 1,600° F., mm | 62 | 68 |
| Microactivity: | | |
| After steaming at 1,050° F., for 24 hours, percent | 90.4 | 91.0 |
| Microactivity of a standard Re catalyst after steaming at 1,050° F. for 24 hours, percent | 84.4 | 84.4 |

The fluoride enhances the ability to withstand severe thermal and steam conditions for longer periods of time. Longer term stability at severe conditions is an important factor since catalysts are within such environments during regeneration cycles.

What is claimed is:

1. A method of producing fluorine containing zeolite molecular sieves comprising:
   (a) providing a reaction mixture of an active alumina solution and an active silica solution wherein the ratio of alumina to silica in said solutions is effective to produce a zeolitic composition;
   (b) providing a fluoride ion solution wherein said fluoride ion solutions whereby a slurry forms;
   the compound selected from the group consisting of ammonium fluoride, ammonium fluosilicate, hydrogen fluoride and fluosilicic acid, said anion radical being present in a ratio of from 0.5 to 50 percent of the active alumina content of said reaction mixture;
   (c) admixing said active alumina, active silica and fluoride ion solutions whereby a slurry forms;
   (d) aging said slurry at a temperature of from about 20° C. to 120° C. for from 1 to 48 hours, whereby a crystalline zeolite is formed which has from about 0.01 to 0.15 percent fluoride coordinated into the crystalline structure; and
   (e) recovering said crystalline zeolite.

2. A method as in Claim 1 wherein said fluoride anion radical is fluoride, and is present in a ratio of about 1 to 7 percent of the active alumina content of said reaction mixture.

3. A method as in Claim 2 wherein said aging is conducted for a first period at about 20 to 70° C., and for a second period at about 70 to 120° C.

4. A method as in Claim 3 wherein said fluoride containing zeolite formed is selected from the group consisting of zeolite A, zeolite X and zeolite Y.

5. A method as in Claim 1 wherein said fluoride anion radical is fluosilicate, and is present in a ratio of about 3 to 25 percent of the active alumina content of said reaction mixture.

6. A method as in Claim 5 wherein said aging is conducted for a first period at about 20 to 70° C., and for a second period at about 70 to 120° C.

7. A method as in Claim 6 wherein said fluoride containing zeolite formed is selected from the group consisting of zeolite A, zeolite X and zeolite Y.

8. A method as in Claim 1 wherein a zeolite seed mixture having a composition of 8–30 $Na_2O$ 0.1–4 $Al_2O_3$ 5–50 $SiO_2$ 50–500 $H_2O$ is admixed in step (c) with said active alumina, active silica and fluoride ion solutions.

9. A method as in Claim 8 wherein said zeolite seed mixture is added in a concentration of from about 1 to 10 percent by weight of the combined active alumina and active silica solution.

10. A method as in Claim 9 wherein said fluoride anion radical is fluoride, and is present in a ratio of about 1 to 7 percent of the active alumina content of said reaction mixture.

11. A method as in Claim 10 wherein said fluoride containing zeolite formed is selected from the group consisting of zeolite A, zeolite X and zeolite Y.

12. A method as in Claim 9 wherein said fluoride anion radical is fluosilicate, and is present in a ratio of about 3 to 25 percent of the active alumina content of said active reaction mixture.

13. A method as in Claim 12 wherein said fluoride containing zeolite formed is selected from the group consisting of zeolite A, zeolite X and zeolite Y.

14. The product of the process of Claim 1.

15. The product of the process of Claim 8.

References Cited

UNITED STATES PATENTS

| 3,594,331 | 7/1971 | Elliott, Jr. | 252—442 |
| 3,578,398 | 5/1971 | Jenkins | 23—113 |
| 3,252,757 | 5/1966 | Granquist | 23—113 X |
| 3,475,349 | 10/1969 | Van Dike | 252—442 |

FOREIGN PATENTS

| 1,903,204 | 10/1969 | West Germany | 423—329 |

CARL F. DEES, Primary Examiner

U.S. Cl. X.R.

252—441, 455 Z

UNITED STATES PATENT OFFICE
CERTIFICATE OF CORRECTION

Patent No. 3,839,539                    Dated October 1, 1974

Inventor(s)   Curtis H. Elliott, Jr.

It is certified that error appears in the above-identified patent and that said Letters Patent are hereby corrected as shown below:

Claim 1, part (b), line 47, after "ion" delete "solutions whereby a slurry forms" and add -- is provided by an anion radical from --.

Signed and sealed this 28th day of January 1975.

(SEAL)
Attest:

McCOY M. GIBSON JR.                C. MARSHALL DANN
Attesting Officer                  Commissioner of Patents